United States Patent
Hoffman et al.

(10) Patent No.: US 11,113,173 B2
(45) Date of Patent: Sep. 7, 2021

(54) SYSTEMS AND METHODS FOR DETECTING, ANALYZING, AND EVALUATING INTERACTION PATHS

(71) Applicant: Rovi Guides, Inc., San Jose, CA (US)

(72) Inventors: Michael Dean Hoffman, Durham, NC (US); Christopher Ambrozic, Chapel Hill, NC (US)

(73) Assignee: Rovi Guides, Inc., San Jose, CA (US)

( * ) Notice: Subject to any disclaimer, the term of this patent is extended or adjusted under 35 U.S.C. 154(b) by 358 days.

(21) Appl. No.: 16/222,857

(22) Filed: Dec. 17, 2018

(65) Prior Publication Data

US 2020/0089592 A1   Mar. 19, 2020

Related U.S. Application Data (60) Provisional application No. 62/730,962, filed on Sep. 13, 2018.

(51) Int. Cl.
*G06F 11/34* (2006.01)
*G06F 3/0482* (2013.01)

(52) U.S. Cl.
CPC ........ *G06F 11/3438* (2013.01); *G06F 3/0482* (2013.01); *G06F 11/3419* (2013.01); *G06F 11/3452* (2013.01); *G06F 11/3476* (2013.01)

(58) Field of Classification Search
CPC ............. G06F 11/3419; G06F 11/3438; G06F 11/3452; G06F 11/3476; G06F 3/0482; G06Q 30/02
See application file for complete search history.

(56) References Cited

U.S. PATENT DOCUMENTS

| 6,963,874 B2 | 11/2005 | Kasriel |
| 10,181,167 B2* | 1/2019 | Eidelman ............. G06F 3/0482 |
| 10,827,013 B2* | 11/2020 | Karon .................... G06F 17/10 |
| 2008/0186276 A1 | 8/2008 | Mayer-Ullman |
| 2018/0167317 A1 | 6/2018 | Hoyne |

FOREIGN PATENT DOCUMENTS

CN           107958022 A      4/2018

OTHER PUBLICATIONS

Bayir et al., "Smart Miner: A New Framework for Mining Large Scale Web Usage Data," International World Wide Web Conference, 18th, ACM Madrid, Spain, pp. 161-170 (2009).
PCT International Search Report and Written Opinion for International Application No. PCT/US2019/050906, dated Dec. 9, 2019 (23 pages).

* cited by examiner

*Primary Examiner* — Elias Desta
(74) *Attorney, Agent, or Firm* — Haley Guiliano LLP (57) ABSTRACT

System and methods are disclosed herein for creating interaction path records using time thresholds between interaction paths. The system retrieves the time threshold and a plurality of user interaction records that each include a timestamp. The system sorts the plurality of user interaction records based on the timestamp. The system then identifies the path-start record as being separated from a prior interaction by an amount of time that exceeds the time threshold. The system identifies the path-end record as being separated from a subsequent interaction by an amount of time that exceeds the time threshold. The system creates an interaction path record, stores that records, and generates a summary with information about the path.

18 Claims, 9 Drawing Sheets

$$\delta = \frac{\partial}{\partial \delta_{end}} \Delta_s - \frac{\partial}{\partial \delta_{end}} (\Delta_b - \Delta_s) = 0$$

FIG. 10 ical application may maintain a data set of interaction events in a time ordered fashion to understand user interaction patterns. From this large pool of data, the analysis application may facet data to specific event details to analyze particular interaction paths users take. Once behaviors and routes through interaction nodes are identified, the analysis application may further extract data to associate interaction paths with particular users (e.g., using user ids) to provide further insights into interaction paths.

SYSTEMS AND METHODS FOR DETECTING, ANALYZING, AND EVALUATING INTERACTION PATHS

CROSS-REFERENCE TO RELATED APPLICATIONS

This application claims priority to U.S. Provisional Application No. 62/730,962 filed Sep. 13, 2018, the content of which is hereby incorporated by reference herein in its entirety.

BACKGROUND

The present disclosure is directed to personalized content discovery platforms and, more particularly, to systems and methods for detecting and analyzing interaction paths in media access systems.

SUMMARY

Currently, users have access to a vast array of content in content delivery systems that provide a vast array of complex menu systems and multilayered interaction paths. It is important to designers of content delivery systems to understand how and when a user achieves success in finding content within the system, especially as these systems continue to grow. As users traverse these complex menu systems, tracking which nodes within a menu system are accessed, when the nodes are accessed, and whether a specific access achieves a user's desired point in the content delivery system are important to understand whether the menu system, and techniques for driving users to content, are achieving their purpose.

Conventional systems for tracking interaction paths rely on nodes being predefined as start and end points that cannot easily account for when a user's interaction path ends prematurely. These systems cannot start a path at an arbitrary point nor can these systems tracks multiple paths that do not span a predefined endpoint. For example, a system for tracking interactions on a webpage may consider a user's first visit to a homepage as a start of an interaction path and consider a user visit to an exit page to be an end of the path. But these systems will not create multiple paths within a series of interactions. Other systems exist for analyzing interaction path require computationally intensive analysis of interaction points that do not adjust to changing user patterns. For example, a system may analyze user interactions to identify routes through a series of interactions as known routes with known starts and ends and then label subsequent user interactions as matching known routes. These systems do not account for when a previously unused path is taken.

Therefore the present disclosure is directed to systems and methods detecting, analyzing, and evaluating interaction paths within a content delivery system, that is, for understanding when and where a user's interaction with a content delivery system begins (i.e., a starting point), where and when the interaction with the content delivery system ends (i.e., the ending point), and the nodes within the content delivery system that were accessed between the start of an interaction (i.e., the start of a path) and the end of an interaction (i.e., the end of a path).

Upon detection of an interaction path, an analysis application may create data visualization and presentation displays (e.g., a dashboard) that shows how users are interacting with a content delivery system. Therefore, an analysis application may maintain a data set of interaction events in a time ordered fashion to understand user interaction patterns. From this large pool of data, the analysis application may facet data to specific event details to analyze particular interaction paths users take. Once behaviors and routes through interaction nodes are identified, the analysis application may further extract data to associate interaction paths with particular users (e.g., using user ids) to provide further insights into interaction paths.

Furthermore, the systems of the present disclosure provide a flexible framework for capturing previously interaction paths without predefining known interaction routes or pre-labeling interaction points as known start and end paths. Furthermore, the system is tunable to changing user patterns and provides an efficient mechanism for analyzing large sets of interaction data. In some embodiments, the systems disclosed analyze past sample user interactions to determine an optimal time threshold between points that span two user interaction paths. Once the system determines this time threshold, the system may efficiently analyze interactions belonging to the same user and identifying the start and end of several interaction points by calculating the difference between interaction points and creating separate paths when timestamps between two points exceed the time threshold. This is an efficient and accurate manner to identify interaction paths from interactions with arbitrary, and potentially unlabeled, interaction nodes that was not present in conventional systems.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
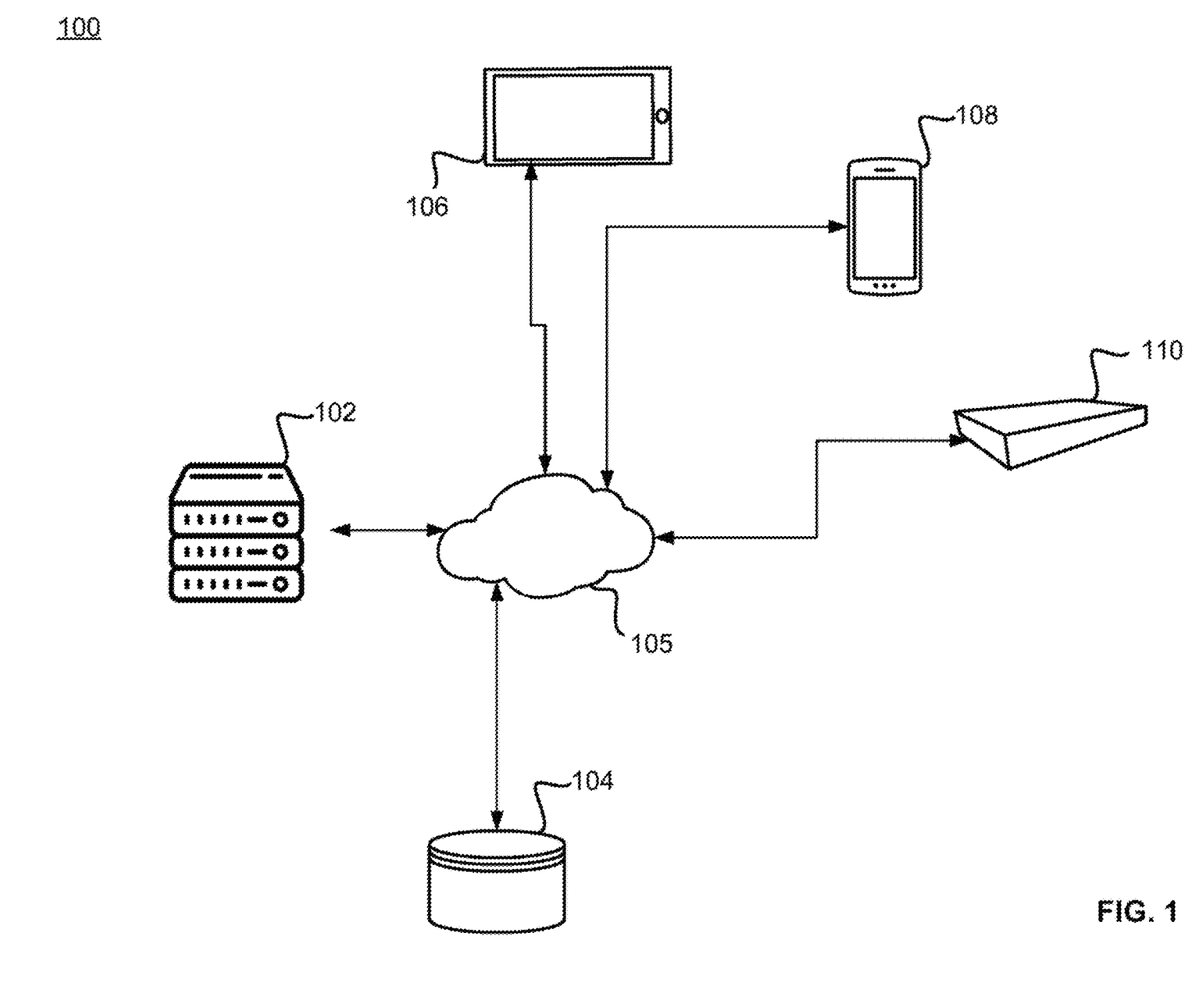
FIG. 1 is a block diagram of an illustrative content delivery system in accordance with some embodiments of the disclosure.

FIG. 1 is a block diagram of an illustrative content delivery system in accordance with some embodiments of the disclosure. The content delivery system 100 of FIG. 1 comprises content delivery system servers 102, a personalized content discovery datastore 104, and several content consumption devices (e.g., tablet 106, smartphone 108, and set-top box 110) in communication via communication network 105.

The content delivery system servers 102, personalized content discovery datastore 104, content consumption devices (e.g., 106, 108, 110) may include one or more circuit boards. In some embodiments, the circuit boards may include processing circuitry, control circuitry, and storage (e.g., RAM, ROM, Hard Disk, Removable Disk, etc.). In some embodiments, circuit boards may include an input/output path. The control circuitry may receive content and data via input/output (hereinafter "I/O") path. The I/O path may provide content (e.g., broadcast programming, on-demand programming, Internet content, content available over a local area network (LAN) or wide area network (WAN), and/or other content) and data to control circuitry, which includes processing circuitry and storage. Control circuitry may be used to send and receive commands, requests, and other suitable data using I/O path. I/O path may connect control circuitry (and specifically processing circuitry) to one or more communications paths (described below). I/O functions may be provided by one or more of these communications paths but are shown as a single path in FIG. 1 to avoid overcomplicating the drawing.

Control circuitry may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry executes instructions for an application stored in memory (e.g., storage). Specifically, control circuitry may be instructed by an analysis application to perform the functions discussed above and below. For example, the analysis application may provide instructions to control circuitry to process interaction paths and display data visualizations. In some implementations, any action performed by control circuitry may be based on instructions received from the application.

In client server-based embodiments, control circuitry may include communications circuitry suitable for communicating with a content delivery application server or other networks or servers. The instructions for carrying out the above-mentioned functionality may be stored on the content delivery application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage that is part of control circuitry. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage may be used to store various types of content described herein as well as media guidance data described above. Nonvolatile memory may also be used (e.g., to launch a boot-up routine and other instructions). Cloud-based storage may be used to supplement storage or instead of local storage.

In some embodiments, the content delivery system servers 102 include computer systems configured to provide content to content consumption devices (e.g., 106, 108, 110) as well as detecting, analyzing, and evaluating interaction paths within a content delivery system. In some embodiments, the functions are contained on one computer system while in other embodiments the functions are distributed across multiple computer systems. Similarly, the datastore 104 may be included in the content delivery system server 102 or may be a stand-alone datastore (e.g., a database held on a computer system) accessible via communication network 105.

The content consumption devices (e.g., 106, 108, 110) may further receive user interactions from users via user interface circuitry. These interactions may include, for example, queries, views, purchases, implicit accesses of content, likes, application consumption events, and item details. This is not an exhaustive list and will depend on the information defined by the content delivery system for tracking. Each interaction may be logged, for example as depicted in block 202 of FIG. 2.

Figure 2:
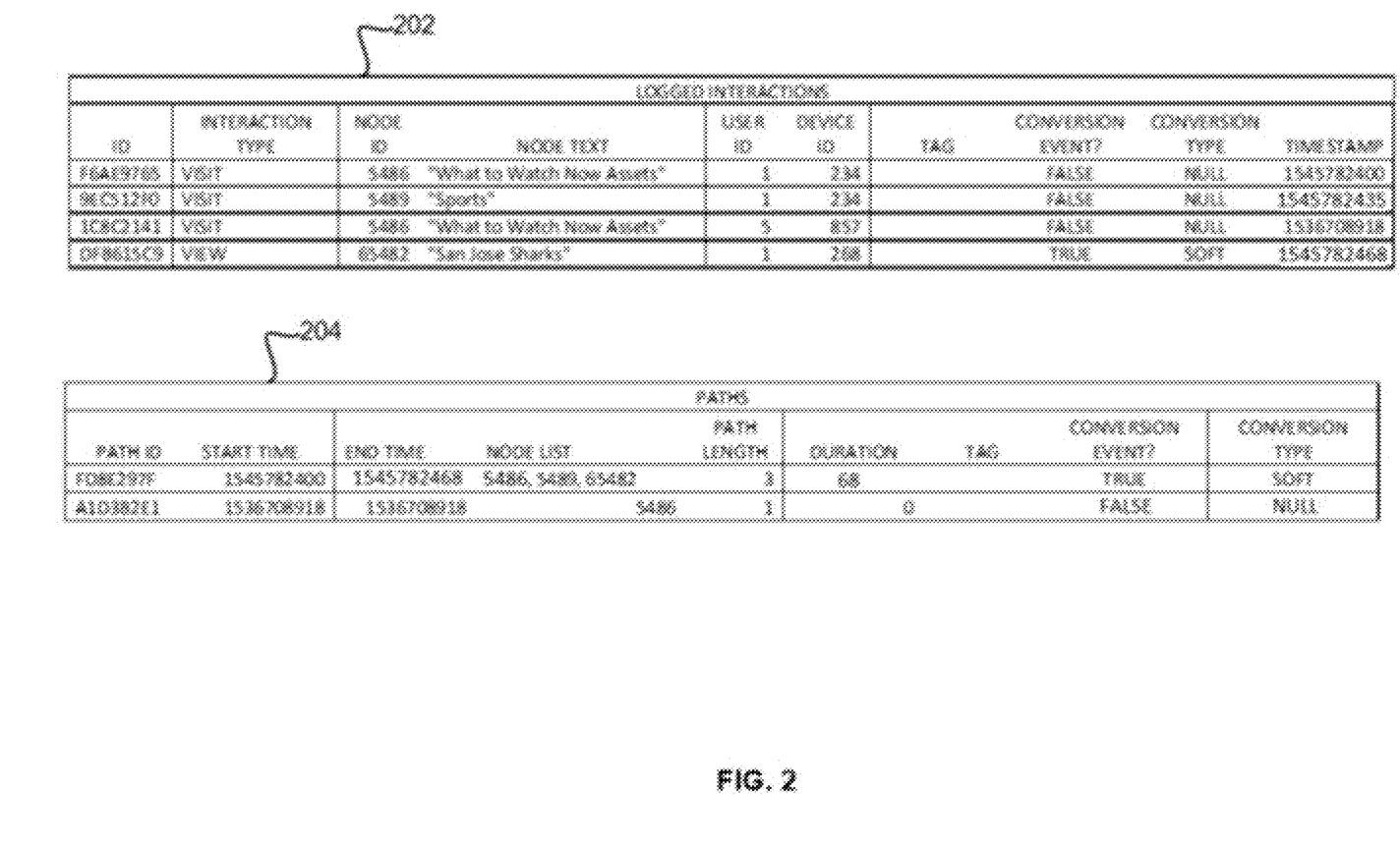
FIG. 2 is a block diagram of illustrative data structures in accordance with some embodiments of the disclosure.

FIG. 2, at block 202, illustrates an exemplary data structure that contains a plurality of logged interactions. Each interaction is stored, for example in a table, as a plurality of data fields in a row of the exemplary data structure. As shown in FIG. 2, the logged instruction data structure 202 may comprise an identifier ("ID"), an interaction type, a node id, node text, a user ID, a device ID, a tag, a Boolean value marking whether the interaction is a conversion event, a conversion type, and a timestamp (e.g., stored in epoch time also known as "Unix" time). While data structure 202 is an exemplary data structure for logged interactions, other suitable data structures may be employed to store similar data. Furthermore, interactions may be stored in several different data structures or tables across multiple devices. In turn, the content delivery system may analyze data from multiple sources when analyzing interaction paths.

An interaction is logged with reference to a node within a system of menus. Each point in the menu, e.g., a node, is defined, for example, by a node ID and is typically associated with node text. Thus, an interaction path is a plurality of nodes linked together. The nodes are derived from events, e.g., interactions, and useful descriptions of that event separated in time order for a specific user id (or, when supported, profile ID or device ID).

Using FIG. 2 as an example, an interaction path for user 1 is made up of 3 logged interactions (interaction IDs: F6AE9765, 9EC512F0, and DFB615C9) which include nodes 5486, 5489, and 65482. Textually, these describe an interaction path going through the following nodes: "What to Watch Now"→"Sports"→"San Jose Sharks". In another example, the interaction path may include the nodes of: "forYou"→"linearView"→"linearView." In this example, the first event in the interaction path (i.e., node) is a query and the second and third events are view events.

As described above, the logged interactions may include a tag that describes the event. For example, the tag may be a use case for the event or a concatenation of the interaction type and word view. To illustrate one such combination of node and tag, the previous path may include: "forYou-iPhone-Home" (where "iPhone" and "Home" are tags)→ "linearView-STB"→"linearView-STB."

In some embodiments, the content delivery system may track additional information (e.g., device) about how the user is using the system. In the above path, the content delivery system is tracking information about the consumption device used to interact with the content delivery system (e.g., the device from which the query was made, i.e., an iPhone) and information about where the results of a query were shown on the consumption device (e.g., on the "Home" page or screen). In some embodiments, a view event does not have a screen associated with it so that information is tracked.

As will be discussed in more detail below, an analysis application may extract logged interactions to identify a set of interactions that make up an interaction path. FIG. 2 also depicts a paths data structure 204. This data structure includes information about paths that analysis application may have identified from the logged interactions. For example, a paths data structure may include fields such as path IDF, start time, end time, node list, path length, duration, tag, a Boolean value marking whether the interaction includes a conversion event, and a conversion type. While data structure 204 is an exemplary data structure for storing path information, other suitable data structures may be employed to store similar data. Furthermore, path information may be stored in several different data structures or tables across multiple devices. In turn, the content delivery system may analyze data from multiple sources when analyzing interaction paths.

Using the first row of data from the paths data structure 204 as an example, the analysis application may determine that a set of logged interactions indicate an interaction path. For example, path FD8E297F may comprise three nodes: 5486, 5489, and 65482. Thus, that path is determined to include 3 nodes giving it a path length of 3. Furthermore, the analysis application may determine, as in the example of path FD8E297F, that the first interaction of the path, e.g., interaction F6AE9765, has a timestamp of 1545782400 in epoch time (i.e., 12:00:00 AM, Dec. 26, 1980) and that the last interaction of the path FD8E297F, e.g., interaction DFB615C9, has a timestamp of 1545982468 (i.e., 12:01:08 AM, Dec. 26, 1980). Thus, the interaction path has a duration of 68 seconds. Other suitable time formats and levels of precision (i.e., to the millisecond) may be employed to track the timing of interactions.

Figure 3:
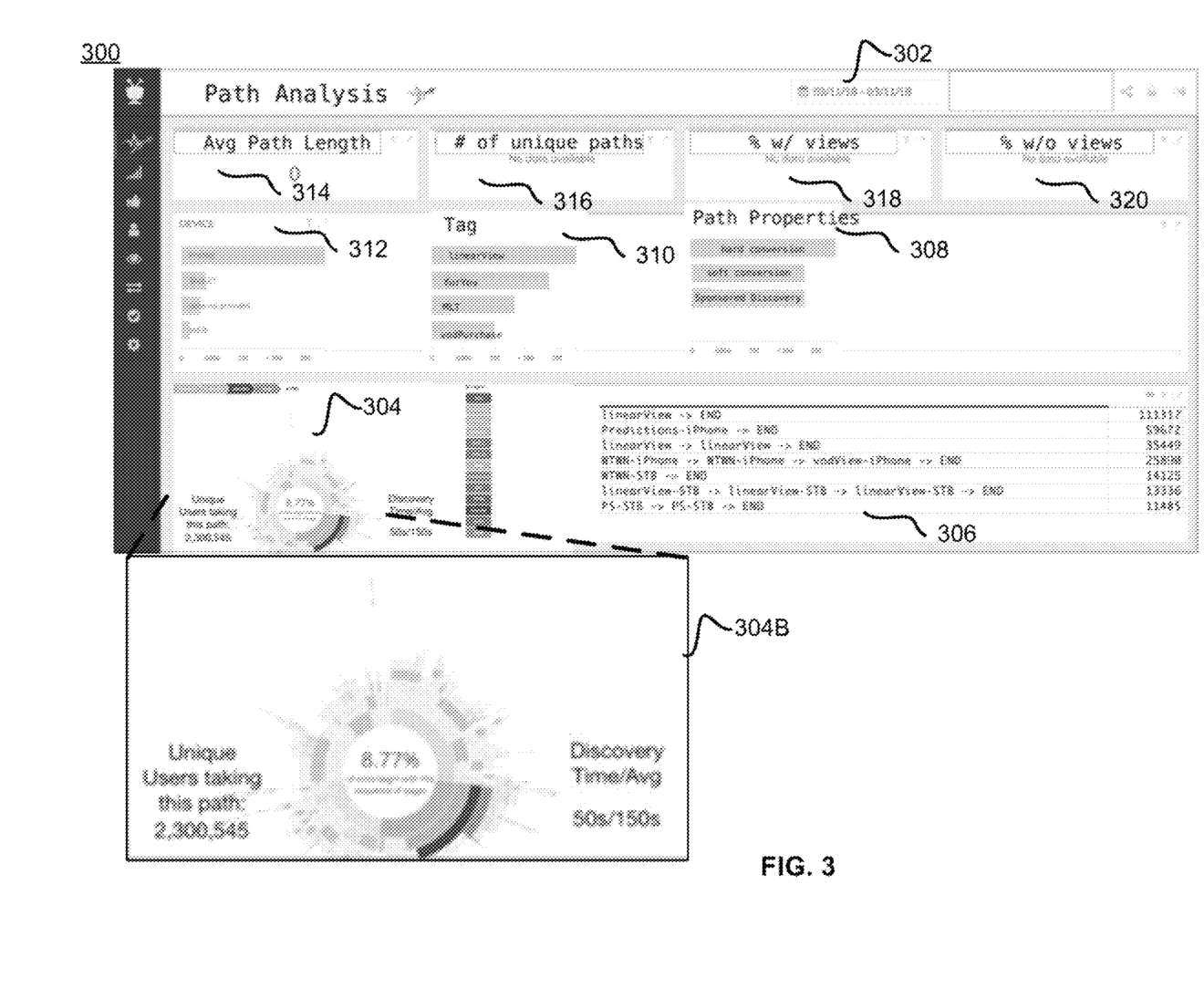
FIG. 3 shows an illustrative example of a user interface for analyzing interaction paths, in accordance with some embodiments of the disclosure.

FIG. 3 shows an illustrative example of a user interface for analyzing interaction paths. In some embodiments, the content delivery system provides user interface 300 via web service or web hosted page. In some embodiments, the content delivery system provides user interface 300 as a client/server application (whether thick or thin client). For example, one or more of the servers 102 may generate the user interface 300 or provide data enabling the generation of user interface 300. The user interface 300 has four sections containing summary statistics (e.g., 314, 316, 318, and 320), facet panels (308, 310, 312), a list of interaction paths 306, and an interactive graphic 304.

The top section of user interface 300 may comprise a set of summary statistics about the paths. For example, the user interface 300 may indicate an average path length 314, a number of unique interactive paths 316, a percent of paths with views 318, a percent of paths with no views 320. In some embodiments, theses aggregations will be over a date range selected at input box 302. In some embodiments, the aggregations are based on additional query information for a selection of interactive paths for which data is desired.

The middle section of user interface 300 may comprise multiple facet panels. For example, the user interface 300 may allow for the display of various features of data comprised in the interactive paths selected for display (e.g., interactive paths in the selected date range). For example, user interface 300 may display a breakdown of device type 312 in the interactive paths, tags 310 present in the interactive paths, and other path properties 308 (e.g., the number of paths that comprise a hard conversion or soft conversion).

The bottom portion of user interface 300 may comprise a sunburst diagram 304 or other suitable diagram for data visualization that displays the resulting interactive paths. The bottom portion of user interface 300 may further comprise a data grid 306 listing the resulting interactive paths.

In some embodiments, the user interface 300 includes a sunburst diagram 304 that is modified to include the number of unique users and the average time spent on a node or path for the subset of the paths shown in the diagram. The average time spent may be displayed next to the global average time spent in an interactive path for reference. In some embodiments, the content delivery application limits the amount of data the sunburst diagram 304 displays to, e.g., the top 200 most frequently followed interactive paths (e.g., interactive paths containing the same or similar set of nodes) for any given set of faceted options. In FIG. 3, sunburst diagram 304 is enlarged to show additional details in element 304B.

In some embodiments, the content delivery system will generate grid panel 306 to be a list of paths that meet the criteria sorted by the most common to the least common. In some embodiments, the content delivery system may provide options to retrieve the viewed data in various suitable formats (e.g., JSON, CSV, XLS).

Figure 4:
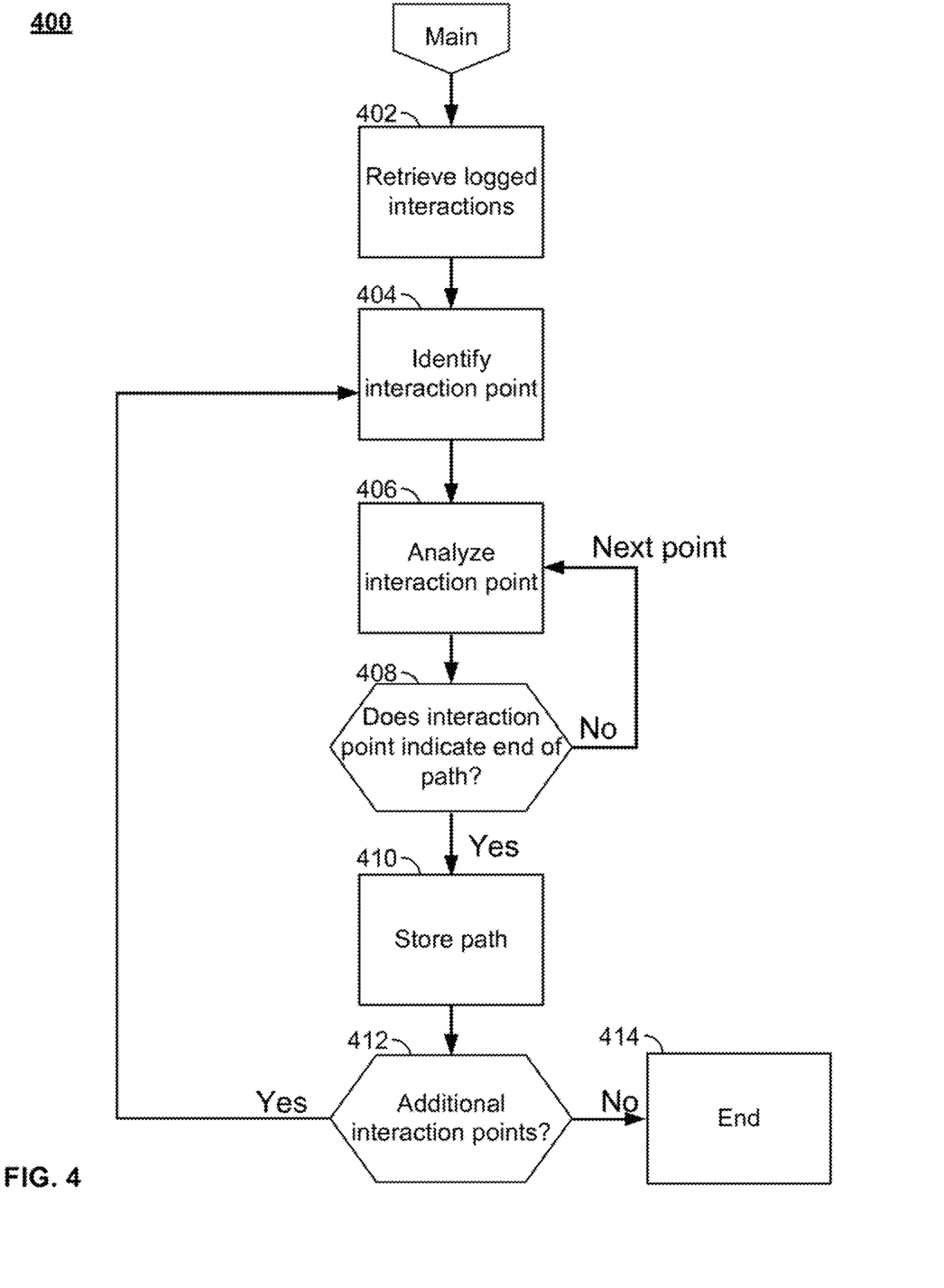
FIG. 4 shows an illustrative example of a process for analyzing interaction points to determine interaction paths, in accordance with some embodiments of the disclosure.

FIG. 4 shows an illustrative example of a process for analyzing interaction points to determine interaction paths. Process 400 begins with the analysis application entering a main function. At step 402, the analysis application retrieves (e.g., using control circuitry) logged interactions. For example, the analysis application may access data store 104 to retrieve a list of logged interactions from data structure 202.

At step 404, the analysis application analyzes (e.g., using control circuitry) a list of retrieved interactions (i.e., the logged interactions) to identify an interaction point. For example, the analysis application may perform data smoothing and/or data correction such as passing the logged interactions through a denoising autoencoder. In some embodiments, the analysis application may extract particular fields from the logged interactions such as timestamps, user ID, device ID, and node ID.

Once an interaction point from the logged interactions is identified, the process 400 analyzes that interaction point at step 406. For example, the analysis application may analyze the logged interactions to determine an interaction path. To construct an interaction path, the analysis application may join data from several relevant data tables. The analysis application may correlate the data based on, for example, user Id. In some embodiments, the analysis application may order the data based on a timestamp such as an epoch timestamp as depicted in logged interactions data structure 202. In some embodiments, the timestamp for an interaction is implicit, e.g., a start time for a query may be used as a timestamp for a view operation.

At step 408, the analysis application determines (e.g., using control circuitry) whether the interaction point indicates an end of a path. The analysis application may employ various appropriate techniques to determine whether an interaction point indicates an end of a path.

In some embodiments, the analysis application may compare a current interaction point with an interaction point that comes immediately before the current interaction point (e.g., based on timestamp ordering) and determine the amount of time between the two interaction points. If the time between the two interaction points (i.e., the difference) exceeds an end point threshold (i.e., an amount of time defined to be the maximum amount of time between interaction points before an interaction path is considered "ended"), then the analysis application may continue to step 410 and store the path. If the analysis application determines, at step 408, that the interaction point does not indicate an end of path, then the analysis application may save the interaction point as part of a current path and continue to the next interaction point at step 406.

In some embodiments, the analysis application iterates through interaction points to find an end point of a path. In some embodiments, the end point is defined as an interaction point that occurs with a timestamp more than some threshold period of time after the subsequent interaction point. For example, if all the interaction points for a user are analyzed as a group (ordered in time), and the end point threshold is 180 seconds, then an interaction point that has a timestamp or more 180 seconds before the next interaction point is an end point. In some embodiments, the analysis application accesses timestamps stored with the interaction points in milliseconds and therefore, first scales the timestamps before analyzing the timestamps. For example, the analysis application may divide the timestamps by 1000. In some embodiments, the analysis application may determine whether an interaction point is a view interaction (i.e., the user viewed content). Because content viewing often consumes large amounts of time, the analysis application may consider the endtime of the viewing interaction as the timepoint of that interaction for comparison purposes, while in other embodiments the analysis application may use the start time of the viewing as the timepoint. In some embodiments, the analysis application may not recognize a set of interaction points as a path until after it finds a first end point and can start with a fresh start point.

In some embodiments, the analysis application may determine an end point in an interaction point according to other techniques. For example, the analysis application may identify metadata in an interaction point that indicates a user cancelled a series of commands, thereby ending an interaction path. In some embodiments, machine-learning algorithms (e.g., a convolutional neural network) may be used to analyze traits for each interaction point and correlate the interaction point as being an end point or not an end point.

At step 410, the analysis application may capture the current set of interaction points as an interaction path and save that information to a datastore (e.g., in a data structure such as 204). At step 412, after the analysis application stores a newly identified path, the analysis application determines (e.g., using control circuitry) whether there are additional interaction points in the logged interaction. If there are additional interaction points to consider for another interaction path, the analysis application continues back to step 404. If there are no additional interaction points to consider for another interaction path, the analysis application continues to the end of process 400 at step 414.

An exemplary function for identifying paths in interaction points follows in pseudo code:

```
delta = 180.0
points = retrievePointsFromDataStore( )
curStartPoint = null
prevPoint = null
pathPoints = [ ]
pathJustEnded = False
foreach curEndPoint in points:
        if pathJustEnded:
                pathPoints = [ ]
                curStartPoint = curEndPoint
                pathJustEnded = False
        if prevPoint != null:
                if curEndPoint['type'] == 'View':
                        curEndPoint['diff'] = curEndPoint['endTime'] - prevPoint['timeStamp']
                else:
                        curEndPoint['diff'] = curEndPoint['timeStamp'] - prevPoint['timeStamp']
                if curStartPoint != null:
                        pathPoints.append(curEndPoint)
                        if curEndPoint['diff']>delta:
                                storePointsAsPath(pathPoints)
                                pathJustEnded = True
                                prevPoint = null
        prevPoint = curEndPoint
```

In some embodiments, the analysis application generates data output that is provided to other computer systems in the content delivery system. For example, a file may be created that includes the fields listed in Table 1.

TABLE 1

| Field Name | Type | Description |
| --- | --- | --- |
| ds | date stamp | Date stamp from interaction tables |
| path_counter | int | Uniquely label and count (by finding max) unique user paths per day |
| userID | string | The userId from interaction tables. This may be used to compute the number of |

TABLE 1-continued

| Field Name | Type | Description |
| --- | --- | --- |
| | | unique users in a selected path from the sunburst diagram. In addition this field may need to be exportable to csv or use by product managers or for targeting by A/B testing or Sponsored Discovery. |
| tag_list | array of stings | Each element may be a tag string associated with each point in a path (null values may not allowed). The list may be ordered by the timestamp of points (earliest first) for the points that comprise the path - [e.g., 'What To Watch Now Assets', 'What To Watch Now Assets', 'What To Watch Now Assets', 'SCHEDULE_RECORD'] |
| device_list | array of stings | Each element may be a string of the device associated with the interaction point in the path if it exists otherwise null or empty string, may be ordered by the timestamp of the points (earliest first) for the points that comprise the path (e.g., ['no data', 'no data', '', 'STB']) |
| total_path_view_duration | int | The sum of the viewDurations of all views that make the path in seconds |
| total_path_time | int | The difference between the min and max time of all interaction points that make up the path in seconds. |
| total_discovery_path_time | int | The difference between total_path_time and total_path_view_duration presented in seconds. This quantity will be needed for calculating the average discovery time for the selected path and for computing the overall average discovery time to compare it to |
| queryId_list - - | array of strings | Each element may be the queryId string associated with each interaction point in the path if it exists otherwise null or empty string, ordered by the timestamp of the points (earliest first) for the points that comprise the path, used to make a hard—conversion flag, may not be persisted |
| view_itemId_list | array of strings | Each element may be the series level title string associated with each view or implicit points in the path if it exists otherwise null or empty string, ordered by the timestamp of the points (earliest first) for the view or implicit points that comprise the path. This may be used to to make the soft conversion flag, may not be persisted |
| hit_array_list | array of arrays of strings | Each element may be a hit array up to 10 in length of the series level title string associated with each of the query points in the path if it exists otherwise null or empty string, ordered by the timestamp of the points (earliest first) for the points that comprise the path. This may be used to make the soft conversion flag, may not be persisted. If more than 10 events are served in the hit_array the first ten may be selected |
| experiment_activations_list | array of strings | Each element is string of the variation_id associated with each of the queries in the path if it exists otherwise null or empty string, ordered by the orderTime of the nodes (earliest first) for the nodes that comprise the path. This is used to make the sponsored discovery flag, does not need to be persisted |
| soft_conversion_flag | boolean | Does this path contain a soft conversion event? In some embodiments, is there an itemId in a hit array that is equal to an itemId in the view_itemId_list where the index position of the hit_array_list is less than the index position of the view_itemId_list |
| hard_conversion_flag | boolean | Does this path contain a hard conversion event? In some embodiments, True if a |

TABLE 1-continued

| Field Name | Type | Description |
|---|---|---|
| | | queryId in the queryId_list occurs more than once otherwise False. May be from a query that precedes a view, but this should be the case unless there is a data issue with duplicate queryIds |
| sponsored_discovery_flag | boolean | In some embodiments, True if the activations list contains a valid id |
| path_text | string | The joined text strings from the tag_list and the device_list assembled in order. This will be the text that is displayed in the frequency ranked list in the bottom right corner of the dashboard. - 'What To Watch Now Assets-no data -> What To Watch Now Assets-no data -> What To Watch Now Assets- -> SCHEDULE_RECORD-STB' |

While the example above is shown with a predefined end point threshold (i.e., 180 seconds), the analysis application may evaluate sample data from time to time to tune and adjust the end point threshold. End point threshold tuning allows the content delivery system and analysis application to dynamically adjust to the analysis of interaction paths based on the changing viewing patterns of content consumption and user interaction. In some embodiments, the analysis application may employ multiple end point thresholds and select an appropriate end point threshold for a given set of interaction points. For example, the analysis application may select the end point threshold back on the user id or device id. The analysis application may further modify the selection of the end point threshold during analysis of the interaction point (e.g., based on nodes visited in an interaction path).

Figure 5:
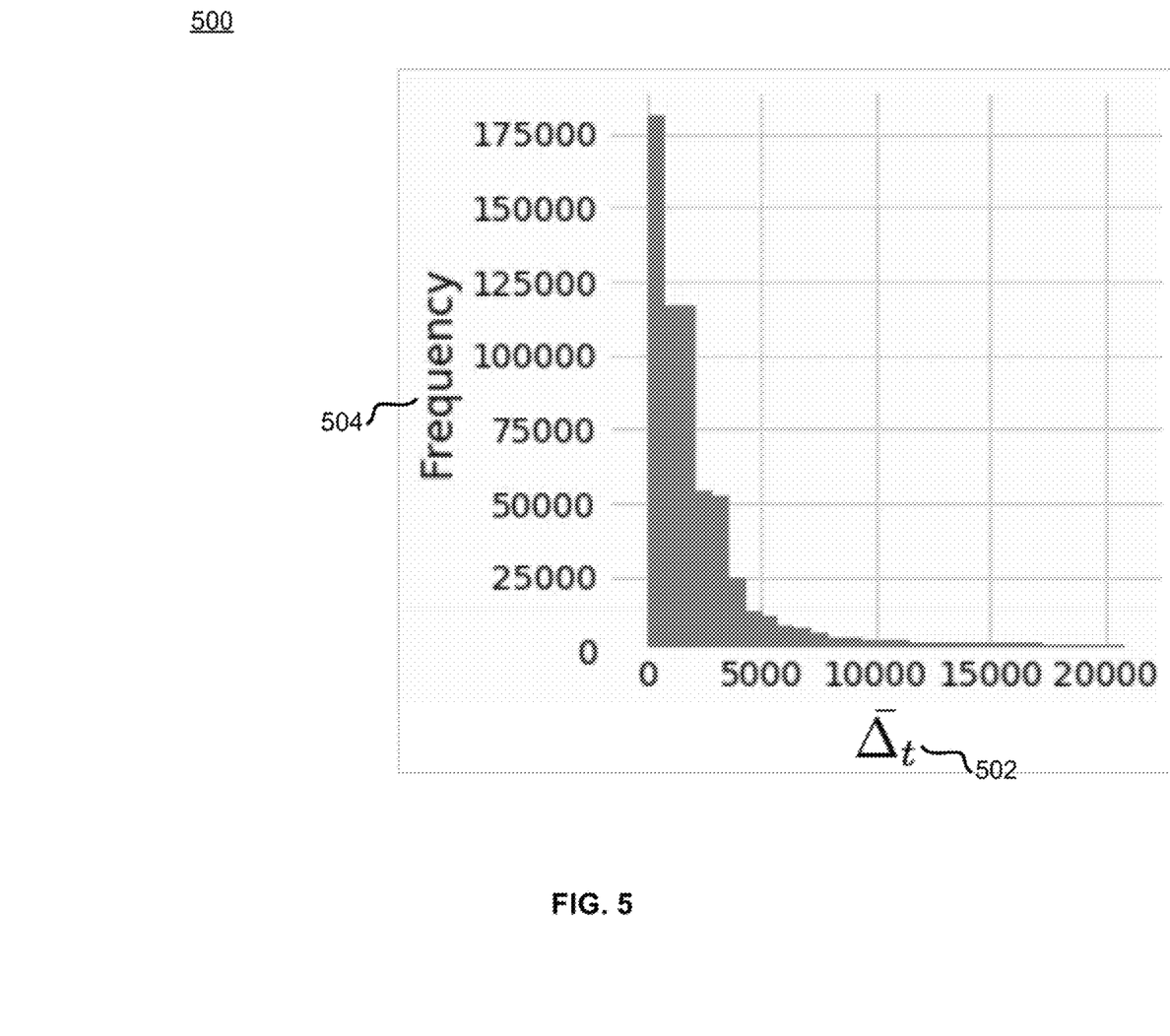
FIG. 5 shows an illustrative example of a frequency occurrence data plot for interaction paths according to time length, in accordance with some embodiments of the disclosure.

In some embodiments, the analysis application may determine the change in time between two interaction times is distributed across interactions and types of interactions. For example, the analysis application may determine that the time between two interactions is dependent on preceding interactions. That is, the amount of time after a query might be different from the amount of time after a view. FIG. 5 shows an illustrative example of a frequency occurrence data plot for the time between interactions. In FIG. 5, the analysis application has analyzed time between interactions and counted the number of times different times between interactions has occurred. On the X-axis, FIG. 5 shows $\Delta t$ 502. In some embodiments, the analysis application may group segments of times between interactions for analysis. In FIG. 5, this is shown as regions of $\Delta t$ and the frequency 504 of the occurrence of each region of $\Delta t$.

In some embodiments, the analysis application may analyze the known interaction times to tune the end point threshold by first assuming an end point threshold. The analysis application may then calculate all interaction paths in the system using that end point threshold. The analysis application may, using these candidate interaction paths, determine the average time between interactions in all candidate interaction paths $\Delta s$. The analysis application may further determine the average time between the two-consecutive candidate interaction paths $\Delta b$. This process is repeated for many end point thresholds to the $\Delta s$ and $\Delta b$ that exist from candidate interaction paths at each end point threshold. The analysis application may then analyze the change between the $\Delta s$ values as a function of the change in the end point threshold (i.e., take the derivative of $\Delta s$ with respect to the end point threshold). The analysis application may also analyze the change between the difference between $\Delta b$ and $\Delta s$ values as a function of the change in the end point threshold (i.e., take the derivative of ($\Delta b-\Delta s$) with respect to the end point threshold). In some embodiments, the analysis application determines the end point threshold associated with rate of change of $\Delta s$ being equal to, or within defined threshold of, ($\Delta b-\Delta s$). For ease of reference, an exemplar equation is noted if FIG. 6.

Figures 6, 7:
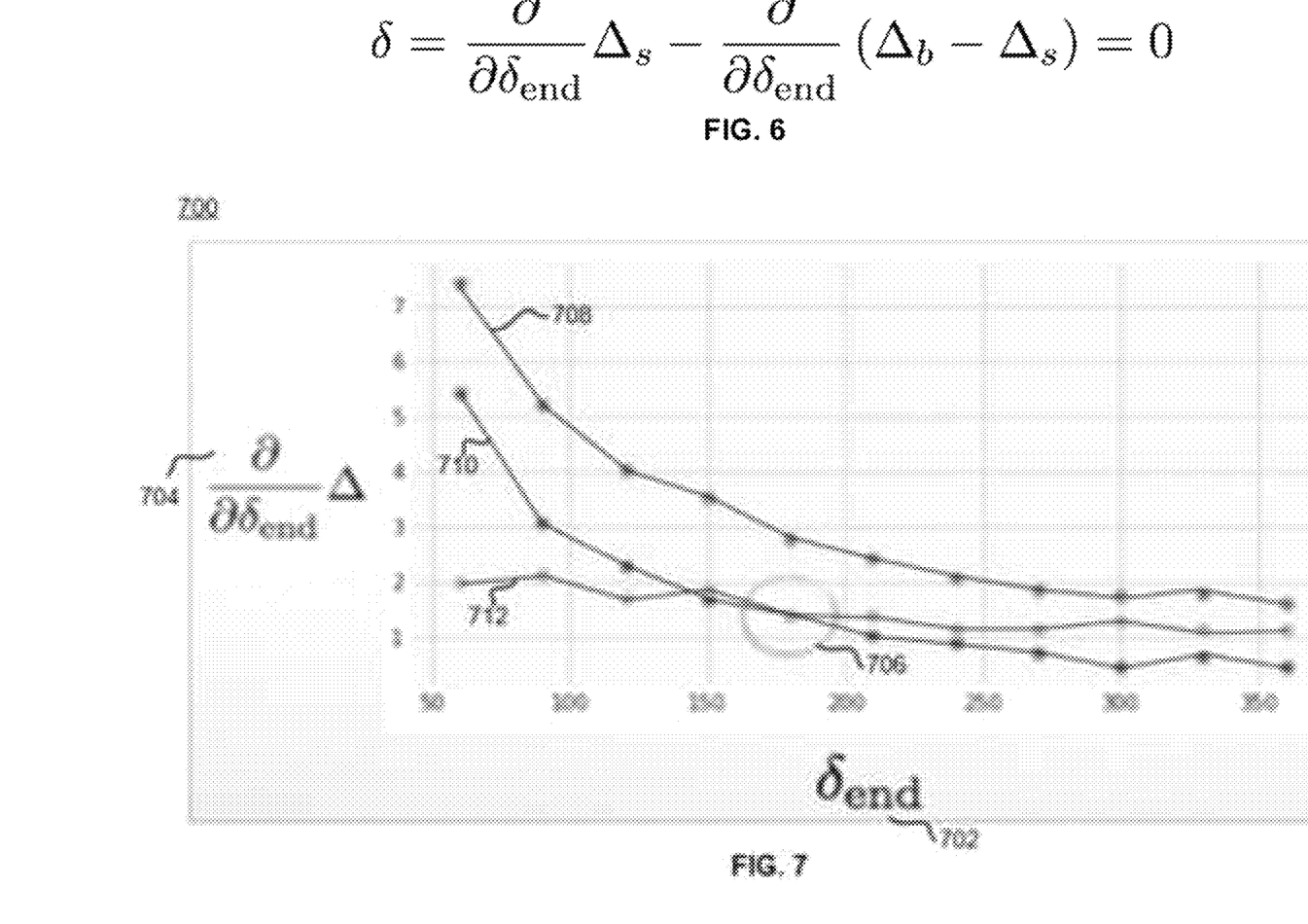
FIG. 6 shows an illustrative example of a calculation used to determine an end point threshold, in accordance with some embodiments of the disclosure.
FIG. 7 shows an illustrative example of an analysis of interaction path data used to determine an end point threshold, in accordance with some embodiments of the disclosure.

FIG. 7 shows an illustrative example of an analysis of interaction path data used to determine an end point threshold, in accordance with some embodiments of the disclosure. In this FIG. 7, the x-axis is used to denote candidate end point thresholds 702 being used to generate candidate interaction points. At each candidate end point threshold, interaction paths are generated, e.g., using the process described with reference to FIG. 4. The analysis application determines the average time between interaction points ($\Delta s$) within the interaction paths. Using that set of data, the analysis application calculates a derivate of $\Delta s$ with respect to the corresponding end point thresholds and plots this value as plot 710. The analysis application determines the average time between interaction paths ($\Delta b$). Using that set of data, the analysis application calculates a derivate of $\Delta b$ with respect to the corresponding end point thresholds and plots this value as plot 708. The analysis application also calculates a derivate of ($\Delta b-\Delta s$) with respect to the corresponding end point thresholds and plots this value as plot 712. The analysis application may select an end point threshold where the derivative of $\Delta s$ is equal to or close to the derivative of ($\Delta b-\Delta s$). That is, a point on plot 700 where line 712 and 710 are at equal, or near equal, values.

The analysis application may repeat the end point tuning periodically to obtain one or more relevant end point thresholds for use in interaction path detection. Furthermore, different data sets or subsets of data may be selected by the analysis application to generate a plurality of end point thresholds relevant to particular data sets. Still other end point tuning techniques may be employed. For example, it may be determined that a series of end point thresholds correspond with a series of $\Delta s$ values that have a low rate of change, i.e., are steady with respect to the end point thresholds, and the analysis application may correlate one of those end points as an ideal end point threshold. Still further appropriate data analysis techniques may yield candidate end point thresholds for tuning.

Figure 8:
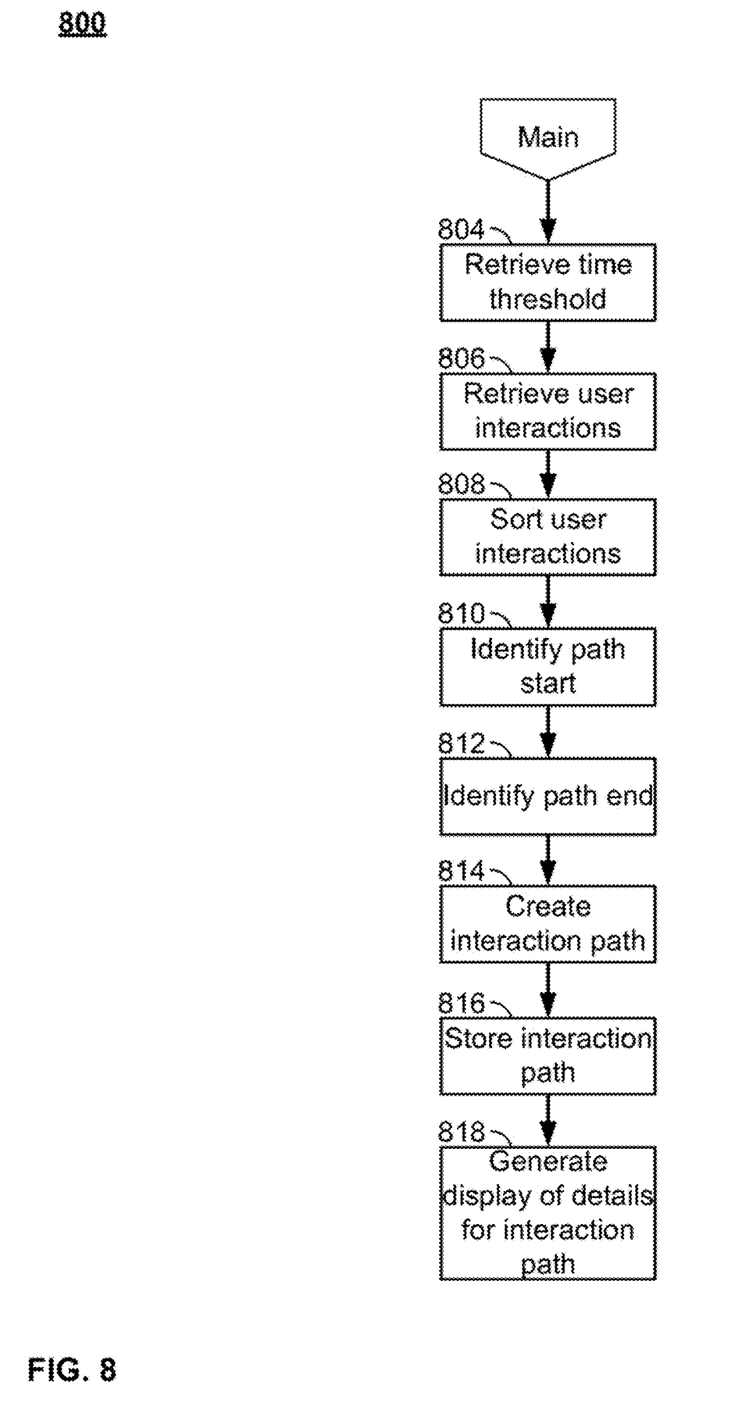
FIG. 8 shows an illustrative example of a process for analyzing interaction points to determine an interaction path, in accordance with some embodiments of the disclosure.

FIG. 8 shows an illustrative example of a process for analyzing interaction points to determine an interaction path, in accordance with some embodiments of the disclosure. Process 800 begins with the analysis application entering a main function. At step 804, the analysis application retrieves (e.g., using control circuitry) a time threshold (e.g., an end point threshold as discussed above with reference to FIG. 7) that is the amount of time used when determining whether two consecutive interactions are in one interaction path. For example, the analysis application may access configuration data from memory to retrieve a predetermined time threshold.

At step 806, the analysis application retrieves a plurality of user interaction records that each include a timestamp. For example, the analysis application may instruct control circuitry to retrieve a list of logged interactions (such as data structure 202) from a data store (such as data store 104). At step 808, the analysis application sorts the plurality of user interaction records based on the timestamp in each user interaction record.

At step 810, the analysis application identifies a path-start record from the plurality of user interaction records. In some embodiments, the analysis application instructs control circuitry to iterate through the sorted plurality of user interaction records starting from the first record. The analysis application computes the time differences between the timestamp of each record and the timestamp of the previous interaction record. The analysis application then compares the difference with the time threshold. When the time threshold is found to be exceeded, the analysis application considers that interaction record to be a path-start record and the previous interaction record to be a path-end record. At step 812, the analysis application (e.g., using control circuitry) identifies a path-end record from the sorted plurality of user interaction records by continuing the iteration until the next path-start and current path-end records are identified. During these iterations, the analysis application may store a list of all interaction records encountered between a particular path's start and end so that a full list of all the records in the path may be associated (e.g., using a linked list, sorted list, dictionary, or other suitable data structure).

At step 814, the analysis application may capture the current set of interaction records as an interaction path as an interaction path record (e.g., data structure 204) that include the part-start record, the path-end record, and a plurality of user interaction records between the path-start record and the path-end record. At step 816, the analysis application may store the interaction path record in a datastore (e.g., in a data structure such as 204) storing the interaction path record.

At step 818, the analysis application may generate a user interface to display details of the interaction path record. For example, the analysis application may create any number of interaction paths from interaction records in a datastore (e.g., data store 104) and store a record for each path. These interaction paths may include paths that span any appropriate amount of time (e.g., minutes, hours, days, etc.) to allow for analysis of user tendencies across appropriate times. The analysis application may, using these interaction records, generate an interface such as user interface 300 of FIG. 3.

In some embodiments, the analysis application may organize the display of the details of interaction path records to collate interaction path that have the same interactions (e.g., interactions on the same node) in the same order as one another. For example, the analysis application may generate a stacked circular histogram (e.g., the sunburst diagram 304) that indicates several unique paths and represents a percentage of paths that follow the same path. For example, if four interaction paths are identified as including interactions in the order of (1) "A→B→C", (2) "A→B→D", (3) "A→D→C", and (4) "G→E→A" then the stacked circular histogram may three layers. The inner layer stacked circular histogram, in this example, could be made up of a circle divided into 2 segments, an "A" segment that is three-quarters of the circle and a "G" segment that is one-quarter. The second layer out may have two segments abutting the "A" segment comprising a "B" segment that is two-thirds of the three-quarter circle and a "D" segment that is one-thirds of the three-quarter circle. The second layer out may also have a "E" segment abutting the "G segment. Finally, a third layer may exists that has a "A→B" and "D" segment abutting the "A→B" segment, a "C" layer abutting the "A→D" segment, and an "A" segment abutting the "G→E" segment. The user interface may be configured to allow a user to click on or more portions of a path to zoom and view details for the portion of the path.

In some embodiments, the analysis application generates the user interface 300 to include summary data regarding the interaction paths. For example, the analysis application may determining an average path length of all the interaction paths that indicates how the average number of nodes (e.g., interactions) that are in each interaction path. The analysis application may also determining how many unique paths exists in the in the plurality of interaction paths. For example, the analysis application may deduplicate the interaction path records so that each record contains a unique ordered list of interactions as compared to others of the unique paths. The analysis application may then include the average path length and the number of unique paths in a summary display.

In some embodiments, the analysis application may also indicate which interaction paths ended unexpectedly. For example, the analysis application may annotate unexpectedly ended interaction paths in user interface 300 with a particular marking, color, or notation. To accomplish this marking, the analysis application may retrieve a plurality of expected interaction end points. The analysis application may then determine whether the path-end record of an interaction path is associated with an expected interaction end point from the plurality of expected interaction end points. For example, the analysis application may compare a node id in the path-end record with a node id associated with each of the expected interaction end points. If none of the expected interaction end points have a matching node id, then the analysis application may store an indication that the interaction path did not end at one of the plurality of expected interaction end points.

In some embodiments, the analysis application may generate indications in the user interface regarding the presence of certain information associated with various interaction points and interaction paths. The interaction path record may indicate several interactions that include interactions that passed through nodes that included attributes (e.g., "hard conversion," "soft conversion," and "Sponsored Discovery"). The analysis application may also determine, for example, the type interaction that was in use during the interactions (e.g., phone, table, remote control, personal computer, web site, or "not recorded"). The analysis application may also calculate a number of interaction path records in the plurality of interaction path records associated with a predefined attribute. The analysis application may then include a summary of the number of interaction path records in the plurality of interaction path records associated with a predefined attribute.

Figure 9:
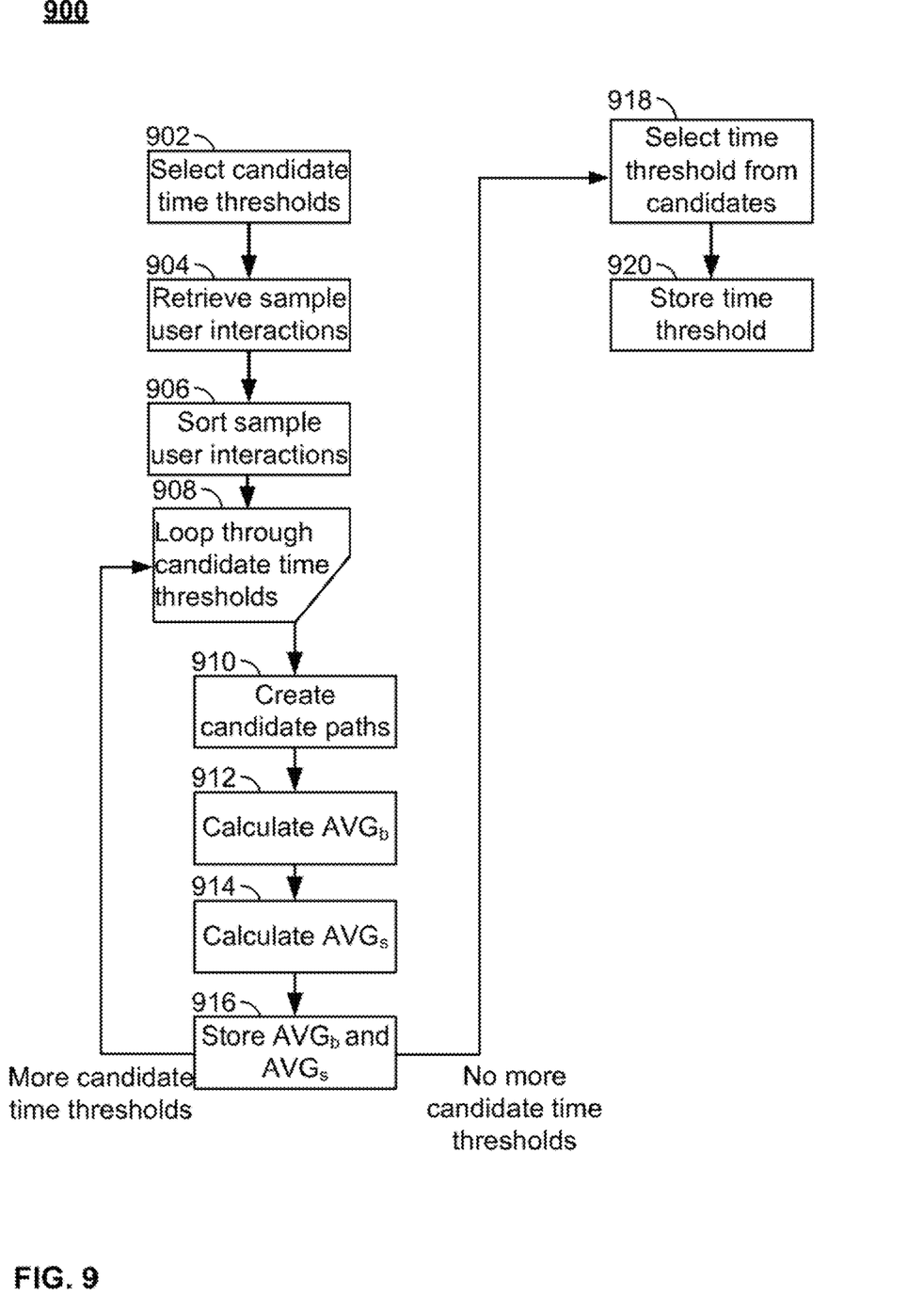
FIG. 9 shows another illustrative example of a process for analyzing interaction path data to determine an end point threshold, in accordance with some embodiments of the disclosure.

FIG. 9 shows another illustrative example of a process for analyzing interaction path data to determine an end point threshold, in accordance with some embodiments of the disclosure. Process 900 begins at step 902, where the analysis application (e.g., using control circuitry) selects a plurality of candidate time thresholds that are each an amount of time used in determining whether two consecutive candidate interactions are in one candidate interaction path. In a manner similar to 806 and 808, the analysis application retrieves a plurality of sample user interaction records and sorts those records by timestamps in the records. The sample user interaction records may include a larger historical set of data than used in FIG. 8 or may include a smaller set of data for the purpose of computation efficiency. In some embodiments, the analysis application may utilize a different set of sample data to calculate the time threshold (e.g., end point threshold).

At step 908, the analysis application (e.g., using control circuitry) iterates through the candidate time thresholds to perform analysis on how each candidate time threshold impacts the properties of interaction paths created using that candidate time threshold and, based on those changes, selects a candidate time threshold to use as the time threshold in the analysis described above (e.g., with reference to FIG. 8).

For example, at step 910, the analysis application creates candidate interactions paths using a particular candidate time threshold and the sample user interactions. This is done in a similar manner as described in FIG. 8. Thus, each the candidate interaction paths are created so that the candidate time threshold is exceeded by a time difference between a start point of each candidate interaction path and an interaction immediately previous to that start point. Once the candidate interaction paths are created, the analysis application can perform an analysis on the candidate interaction paths as described above with reference to FIG. 7. At step 912, the analysis application calculates an average time ("AVGb") between an end of each candidate interaction path and a start of an immediately subsequent candidate interaction path. At step 914 the analysis application calculates, for the plurality of candidate interaction records, an average time ("AVGs") between candidate interaction records that share a candidate interaction path and are consecutive. At step 916, the analysis application stores the AVGb and the AVGs in association with the corresponding candidate time threshold. Steps 910-916 are then repeated for each candidate time threshold until and AVGb and AVGs are saved for each candidate time threshold.

At step 918, the analysis application determines (e.g., using control circuitry), based on the AVGb and AVGs that correspond with each candidate time threshold, which candidate time threshold to use as the time threshold and, at step 920, the analysis application stores the time threshold.

Figure 10:
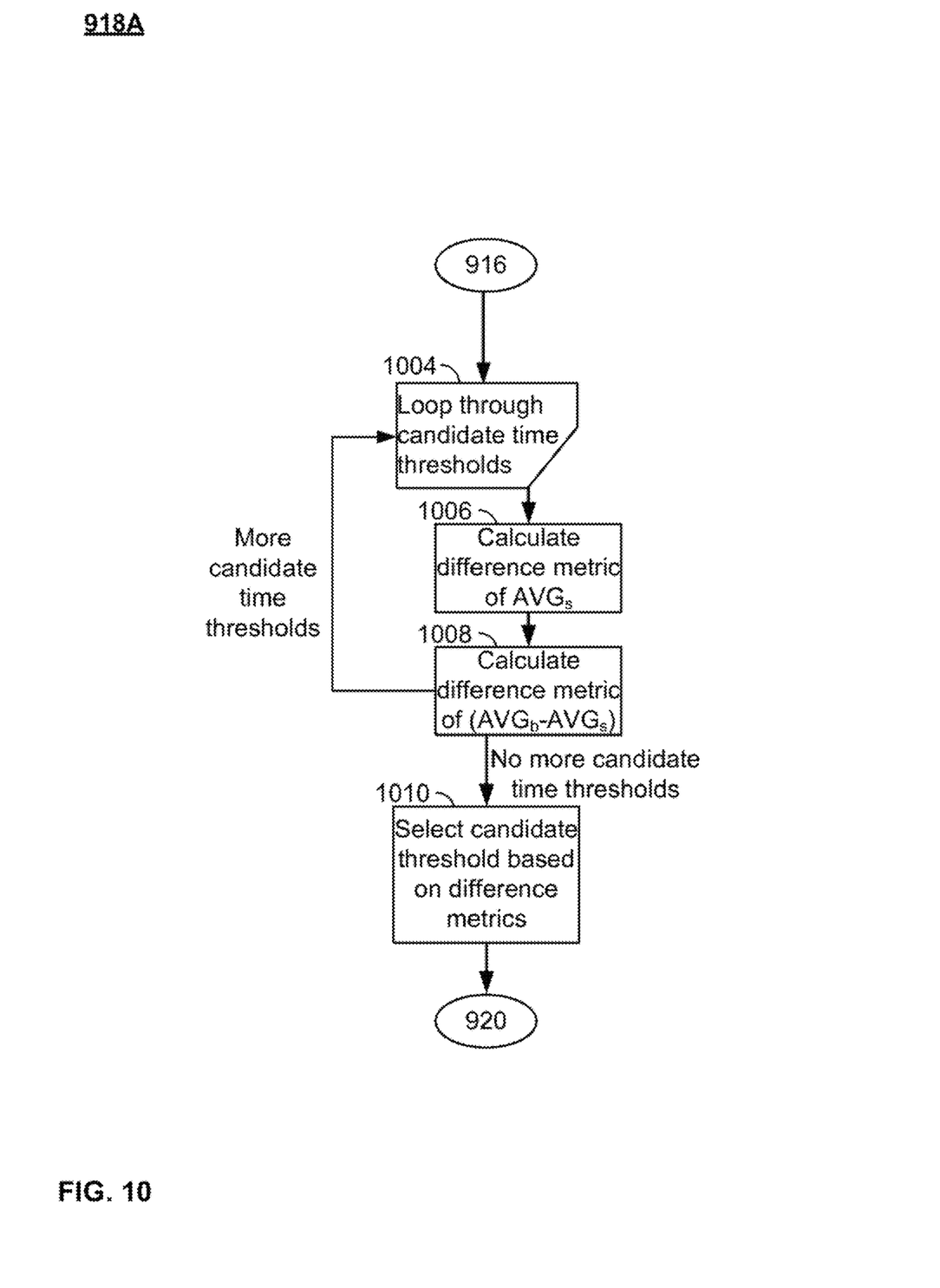
FIG. 10 shows illustrative example of a process for selecting a candidate time threshold, in accordance with some embodiments of the disclosure.

FIG. 10 shows illustrative example of a process for selecting a candidate time threshold to use as the time threshold, in accordance with some embodiments of the disclosure. Process 918A begins after step 916 of FIG. 9. At step 1004, the analysis application iterates through each of the candidate time thresholds. At step 1006, the analysis application calculates a first difference metric for a change of AVGs with respect to the change of the candidate time threshold. In some embodiments, the analysis application computes the difference metric as a derivate of $\Delta s$ with respect to the corresponding end point thresholds as described above in FIG. 7. At step 1008, the analysis application calculates a second difference metric for a change of AVGb minus AVGs with respect to the change of the candidate time threshold. In some embodiments, the analysis application computes the second difference metric as a derivate of $(\Delta b - \Delta s)$ with respect to the corresponding end point thresholds as describe above in FIG. 7. The analysis application repeats steps 1006 and 1008 until all candidate thresholds are processed.

At step 1010, the analysis application selects a candidate time threshold as the time threshold based on the first difference metric and second difference metric. In some embodiments, the analysis application selects a candidate time at which the first difference metric is within a predefined threshold of the second difference metric. In some embodiments, the analysis application selects a candidate time threshold as the time threshold at which the difference between the first difference metric and the second difference metric is minimized.

While some portions of this disclosure may make reference to "convention," any such reference is merely for the purpose of providing context to the invention(s) of the instant disclosure, and does not form any admission as to what constitutes the state of the art.

What is claimed:
1. A method for generating interaction path details from a plurality of user interactions, the method comprising:
    retrieving a time threshold, wherein the time threshold is an amount of time used in determining whether two consecutive interactions are in one interaction path;
    retrieving, from memory, a plurality of user interaction records, wherein each user interaction record comprises a timestamp and wherein the plurality of user interaction records correspond to interactions of a plurality of users with a content delivery platform across a plurality of devices;
    sorting the plurality of user interaction records based on the timestamp in each user interaction record;
    identifying a path-start record from the plurality of user interaction records, wherein the difference between the timestamp in the path-start record and the timestamp of a user interaction record immediately before the path-start record exceeds the time threshold;
    identifying a path-end record from the plurality of user interaction records, wherein the difference between the timestamp in the path-end record and the timestamp of a user interaction record immediately after the path-end record exceeds the time threshold;
    creating a first interaction path record comprising the path-start record, the path-end record, and a plurality of user interaction records between the path-start record and the path-end record;
    storing, in the memory, the first interaction path record;
    identifying, based on the first interaction path record, a second interaction path record;
    determining, based on a first timestamp corresponding to the first interaction path path-end record and a second timestamp corresponding to the second interaction path path-start record, an optimal time threshold;
    creating, based on the optimal time threshold, a candidate interaction path; and
    generating, for display, a user interface to display details of the first interaction path record, the second interaction path record, and the candidate interaction path, wherein the details comprise respective summary statistics for each respective path.

2. The method of claim 1, further comprising:
    selecting a plurality of candidate time thresholds, wherein each candidate time threshold is an amount of time used in determining whether two consecutive candidate interactions are in one candidate interaction path based on that candidate time threshold;

retrieving a plurality of sample user interaction records, wherein each sample user interaction record comprises a timestamp;

sorting the plurality of candidate user interaction records based on the timestamp in each user candidate interaction record;

for each of the plurality of candidate time thresholds:
creating a plurality of candidate interaction paths from the plurality of candidate user interaction records, wherein the candidate time threshold is exceeded by a time difference between a start point of each candidate interaction path and an interaction immediately previous to that start point;

calculating, for the plurality of candidate interaction paths, an average time ("$AVG_b$") between an end of each candidate interaction path and a start of an immediately subsequent candidate interaction path;

calculating, for the plurality of candidate interaction records, an average time ("$AVG_s$") between candidate interaction records that share a candidate interaction path and are consecutive; and storing the $AVG_b$ and the $AVG_s$ in association with the corresponding candidate time threshold;

determining, based on the $AVG_b$ and the $AVG_s$ that correspond with each candidate time threshold, which candidate time threshold to use as the time threshold; and storing the time threshold.

3. The method of claim 2, wherein determining, based on the $AVG_b$ and the $AVG_s$ that correspond with each candidate time threshold, which candidate time threshold to use as the time threshold comprises:

for each of the plurality of candidate time thresholds:
calculating a first difference metric for a change of $AVG_s$ with respect to the change of the candidate time threshold; and calculating a second difference metric for a change of $AVG_b$ minus $AVG_s$ with respect to the change of the candidate time threshold; and wherein the candidate time threshold to use as the time threshold is determined as the candidate time threshold at which the first difference metric is within a predefined threshold of the second difference metric.

4. The method of claim 2, wherein determining, based on the $AVG_b$ and the $AVG_s$ that correspond with each candidate time threshold, which candidate time threshold to use as the time threshold comprises:

for each of the plurality of candidate time thresholds:
calculating a first difference metric for a change of $AVG_s$ with respect to the change of the candidate time threshold; and calculating a second difference metric for a change of $AVG_b$ minus $AVG_s$ with respect to the change of the candidate time threshold; and wherein the candidate time threshold to use as the time threshold is determined as the candidate time threshold at which the difference between the first difference metric and the second difference metric is minimized.

5. The method of claim 1, further comprising organizing the display of the details of each of the respective interaction path records to collate other interaction path records comprising interactions in the same order as a respective interaction path record.

6. The method of claim 5, wherein the organizing the display of the details of each of the respective interaction path records comprises generating a stacked circular histogram wherein each column of the stacked circular histogram represents collated interaction path records.

7. The method of claim 1, further comprising:
determining an average path length of a plurality of interaction paths, wherein a path length is determined as the number of interactions in an interaction path record;

determining a number of unique paths in the plurality of interaction paths, wherein a unique path is comprised of a unique ordered list of interactions as compared to others of the unique paths; and generating, for display, a summary of the plurality of interaction path records comprising the average path length and the number of unique paths.

8. The method of claim 1, further comprising:
retrieving a plurality of expected interaction end points;
determining whether the path-end record is associated with an expected interaction end point in the plurality of expected interaction end points;

in response to determining that the path-end record is not associated with an expected interaction end point in the plurality of expected interaction end points, storing an indication that the interaction path did not end at one of the plurality of expected interaction end points.

9. The method of claim 1, further comprising:
determining, for each of a plurality of interaction path records, whether at least one interaction record associated with that interaction path record comprises a predefined attribute;

calculating a number of interaction path records in the plurality of interaction path records associated with at least one interaction record that comprises the predefined attribute; and generating, for display, a summary of the number of interaction path records in the plurality of interaction path records associated with at least one interaction record that comprises the predefined attribute.

10. A system for generating an interaction path details from a plurality of user interactions, the system comprising:
a storage device configured to store user interaction records;

control circuitry configured to:
retrieve a time threshold, wherein the time threshold is an amount of time used in determining whether two consecutive interactions are in one interaction path;

retrieve, from the storage device, a plurality of user interaction records, wherein each user interaction record comprises a timestamp and wherein the plurality of user interaction records correspond to interactions of a plurality of users with a content delivery platform across a plurality of devices;

sort the plurality of user interaction records based on the timestamp in each user interaction record;

identify a path-start record from the plurality of user interaction records, wherein the difference between the timestamp in the path-start record and the timestamp of a user interaction record immediately before the path-start record exceeds the time threshold;

identify a path-end record from the plurality of user interaction records, wherein the difference between the timestamp in the path-end record and the timestamp of a user interaction record immediately after the path-end record exceeds the time threshold;

create a first interaction path record comprising the path-start record, the path-end record, and a plurality of user interaction records between the path-start record and the path-end record;

store, in memory, the first interaction path record;

identify, based on the first interaction path record, a second interaction path record;

determine, based on a first timestamp corresponding to the first interaction path path-end record and a second timestamp corresponding to the second interaction path path-start record, an optimal time threshold;

create, based on the optimal time threshold, a candidate interaction path; and generate, for display, a user interface to display details of the first interaction path record, the second interaction path record and the candidate interaction path, wherein the user interface comprises respective summary statistics for each respective path.

11. The system of claim 10, wherein the control circuitry is configured to:

select a plurality of candidate time thresholds, wherein each candidate time threshold is an amount of time used in determining whether two consecutive candidate interactions are in one candidate interaction path based on that candidate time threshold;

retrieve a plurality of sample user interaction records, wherein each sample user interaction record comprises a timestamp;

sort the plurality of candidate user interaction records based on the timestamp in each user candidate interaction record;

process a plurality of candidate time thresholds by:
creating a plurality of candidate interaction paths from the plurality of candidate user interaction records, wherein the candidate time threshold is exceeded by a time difference between a start point of each candidate interaction path and an interaction immediately previous to that start point;

calculating, for the plurality of candidate interaction paths, an average time ("$AVG_b$") between an end of each candidate interaction path and a start of an immediately subsequent candidate interaction path;

calculating, for the plurality of candidate interaction records, an average time ("$AVG_s$") between candidate interaction records that share a candidate interaction path and are consecutive; and storing the $AVG_b$ and the $AVG_s$ in association with the corresponding candidate time threshold;

determine, based on the $AVG_b$ and the $AVG_s$ that correspond with each candidate time threshold, which candidate time threshold to use as the time threshold; and store the time threshold.

12. The system of claim 11, wherein the control circuitry determines, based on the $AVG_b$ and the $AVG_s$ that correspond with each candidate time threshold, which candidate time threshold to use as the time threshold by:

process a plurality of candidate time thresholds by:
calculating a first difference metric for a change of $AVG_s$ with respect to the change of the candidate time threshold; and calculating a second difference metric for a change of $AVG_b$ minus $AVG_s$ with respect to the change of the candidate time threshold; and wherein the candidate time threshold to use as the time threshold is determined as the candidate time threshold at which the first difference metric is within a predefined threshold of the second difference metric.

13. The system of claim 11, wherein the control circuitry determines, based on the $AVG_b$ and the $AVG_s$ that correspond with each candidate time threshold, which candidate time threshold to use as the time threshold by:

process a plurality of candidate time thresholds by:
calculating a first difference metric for a change of $AVG_s$ with respect to the change of the candidate time threshold; and calculating a second difference metric for a change of $AVG_b$ minus $AVG_s$ with respect to the change of the candidate time threshold; and wherein the candidate time threshold to use as the time threshold is determined as the candidate time threshold at which the difference between the first difference metric and the second difference metric is minimized.

14. The system of claim 10, wherein the control circuitry is configured to organize the display of the details of each of the respective interaction path records to collate other interaction path records comprising interactions in the same order as the interaction path record.

15. The system of claim 14, wherein control circuitry is configured to organize the display of the details of each of the respective interaction path records by generating a stacked circular histogram wherein each column of the stacked circular histogram represents collated interaction path records.

16. The system of claim 10, wherein the control circuitry configured to:

determine an average path length of a plurality of interaction paths, wherein a path length is determined as the number of interactions in an interaction path record;

determine a number of unique paths in the plurality of interaction paths, wherein a unique path is comprised of a unique ordered list of interactions as compared to others of the unique paths; and generate, for display, a summary of the plurality of interaction path records comprising the average path length and the number of unique paths.

17. The system of claim 10, wherein the control circuitry is configured to:

retrieve a plurality of expected interaction end points;

determine whether the path-end record is associated with an expected interaction end point in the plurality of expected interaction end points;

in response to determining that the path-end record is not associated with an expected interaction end point in the plurality of expected interaction end points, store an indication that the interaction path did not end at one of the plurality of expected interaction end points.

18. The system of claim 10, wherein the control circuitry is configured to:

determine, for each of a plurality of interaction path records, whether at least one interaction record associated with that interaction path record comprises a predefined attribute;

calculate a number of interaction path records in the plurality of interaction path records associated with at least one interaction record that comprises the predefined attribute; and generate, for display, a summary of the number of interaction path records in the plurality of interaction path records associated with at least one interaction record that comprises the predefined attribute.

* * * * *